United States Patent [19]

Asai et al.

[11] 4,244,653
[45] Jan. 13, 1981

[54] COLOR DETECTING DEVICE FOR COLOR PRINTER

[75] Inventors: Eiichi Asai; Fumio Matsumoto; Takaaki Terasita, all of Minami-ashigara, Japan

[73] Assignee: Fuji Photo Film Co., Ltd., Minami-ashigara, Japan

[21] Appl. No.: 908,450

[22] Filed: May 22, 1978

[30] Foreign Application Priority Data

May 25, 1977 [JP] Japan .................................. 52/60830

[51] Int. Cl.$^2$ .......................... G01J 3/46; G03B 27/78
[52] U.S. Cl. ....................................... 356/404; 354/38
[58] Field of Search ............................ 356/404; 354/38

[56] References Cited

U.S. PATENT DOCUMENTS

| | | | |
|---|---|---|---|
| 3,653,759 | 4/1972 | Klein | 356/404 |
| 4,101,216 | 7/1978 | Grossmann | 356/404 |
| 4,120,581 | 10/1978 | Takahashi et al. | 355/38 |

*Primary Examiner*—Vincent P. McGraw

*Attorney, Agent, or Firm*—Gerald J. Ferguson, Jr.; Joseph J. Baker

[57] ABSTRACT

Red, green and blue densities of a color negative are measured at a plurality of points thereon. The measured densities are normalized by a normalizing circuit so that the same levels of density signals can be obtained regardless of the gamma value and sensitivity of the negatives when the same subject matter is photographed under the same conditions. The normalized density signals are plotted in a chromaticity coordinate system and examined as to whether or not they fall within a given region defining a particular color in the chromaticity coordinate system. When the level of the normalized signals with respect to a given point falls within the given region, the point is determined to have the particular color defined by the region in the chromaticity coordinate system. When the color negative includes a predetermined number of points of the particular color, the exposure in a color printer is controlled to reproduce the particular color in a desirable condition.

5 Claims, 9 Drawing Figures

COLOR DETECTING DEVICE FOR COLOR PRINTER

BACKGROUND OF THE INVENTION

1. Field of the Invention

This invention relates to a device for detecting a particular color in color negatives or originals, and more particularly to a device for determining whether or not a particular color especially desired to be reproduced in a good condition such as flesh color is included in color negatives or originals.

2. Description of the Prior Art

It is generally desirable to be able to obtain color prints of proper color balance and density even from color negatives or originals having undesirable color balance and density. At the same time, since, depending on the subject matter of the photograph, most observers are concerned about a particular color as flesh color, green of green grass or blue of sky or water, it is often desirable that one of these colors be reproduced in particularly good condition. In other words, color prints in which such particular colors are not reproduced in good condition are apt to be regarded as unsatisfactory prints. According to an investigation conducted by the inventors, about 80% of the time the principal subject matter of color negatives is the human figure. Therefore, it is especially desirable that flesh color be reproduced in a good condition.

As is well known in the art, color prints of high quality, i.e., color prints of proper color balance and density, can be obtained even from color negatives of undesirable color balance and density by controlling the exposure in a photographic color printer.

In determining exposure in color printers, various methods have been known and practically employed. A well-known printing system in which the printing light source intensity is adjusted during red, green and blue exposures to levels which will normalize the resulting integrated transmittances to a near-neutral color balance, i.e., "gray", is based on U.S. Pat. No. 2,571,697, Evans. This printing system produces satisfactory results from a large majority of the negatives of a given type of film. It has also been known in the art to adjust the rate of correction for red, green and blue exposures based on a linear combination of the red, green and blue large area transmission densities (LATD) of the original to be printed.

Since the above described conventional printing systems are based on integrated transmission measurements conducted over the whole area of the original, the obtained prints are not always satisfactory. For instance, if the background of the principal subject matter is primarily red (red curtain or furniture), green (green grass or foliage) or blue (blue sky or water), color correction based only on the aforesaid LATD system is unsatisfactory. This problem is known as "color failure".

Further, if the background of the principal subject matter is of particularly high or low brightness, the conventional correction based on the integrated transmission density does not give satisfactory results. For example, when the principal subject matter has been photographed with a back light or in a spotlight conventional correction will give unsatisfactory results. This is known as "density failure".

According to the inventors' tests, in the color printing process using the LATD printing system the yield of satisfactory prints is about 70% of all the prints obtained.

It has also been known in the prior art to determine the exposure in a color printer based on the measured densities of divided areas of color originals in which the entire area of the original is divided into upper and lower, right and left, and central and peripheral sections. The exposure is determined based on a combination of the LATD and the densities of the divided areas. In this system, the yield of satisfactory prints is somewhat raised. However, since the density of the principal subject matter is not accurately measured in this system, the correction is not always effected in the most desirable manner.

In order to solve the above described problems in a photographic color printing process, there has been proposed a novel method of color printing in which the color negatives are printed based on a predetermined particular color when the color negatives have a predetermined particular color as the principal subject matter and the color negatives or originals are printed according to the conventional LATD printing system or the like when their principal subject matter does not have the particular color (U.S. patent applications Ser. Nos. 808,903 and 817,059).

In this method, the red, green and blue densities of a color negative are measured at a number of points thereon. A point is determined to have the predetermined particular color when the measured values of red, green and blue densities fall within a predetermined region in a chromaticity coordinate system when plotted therein. Thus, the particular color is defined by a particular region in the chromaticity coordinate system, which may be a three-dimensional system or a two-dimensional system the axes of which represent the red, green and blue densities or combinations of the three color densities.

When the negative has more than a certain number of points of the particular color, it is determined that its principal subject matter has the particular color and that the negative is to be printed based on the particular color.

It has been found that the yield of satisfactory color prints can be substantially raised in accordance with this method. However, in this method there is a problem that errors in determination of the color of the individual points may occur in some types of color negatives when various types of color negatives having different gamma values and sensitivities are used, since the densities vary depending on the gamma value and sensitivity of the film even if the same subject matter is photographed under the same conditions.

SUMMARY OF THE INVENTION

Accordingly, the primary object of the present invention is to provide a device, usable with various types of negatives, for detecting a particular color in color negatives or originals which can accurately determine whether or not the particular color is included in the color negatives or originals.

In accordance with the present invention the color negative to be printed is measured of its red, green and blue densities at a number of points thereon. The measured values are corrected depending on the gamma value and sensitivity of the color negative by a normalizing means so that the same value is outputted for the same subject matter photographed under the same condition regardless of the gamma value and the sensitivity of the color negative or original. When the corrected values of the red, green and blue densities of a point fall within a predetermined region of the chromaticity coordinate system defining the particular color, the point is determined to be of the particular color. Said region defining the particular color can be represented by a formula. Thus, the corrected values are put into the formula and it is determined by calculation whether or not the densities fall within the region.

The region defining a particular color is experimentally determined by measuring a large number of points of the particular color and processing the measured red, green and blue densities in a statistical manner.

DESCRIPTION OF THE PREFERRED EMBODIMENT

Now an example of the method for determining the region defining a particular color will first be described with respect to the case of flesh color.

The present inventors used a Macbeth densitometer to measure a large number of points of flesh color in a number of color negatives photographed under the daylight condition. The size of the scanning spot was 1 mm in diameter. The average red, green and blue densities were 0.923, 0.903 and 0.862, respectively.

Further, the results of the measurement showed that the red, green and blue densities R, G and B had three dimensional Gaussian distributions about a central point of $(\bar{R}, \bar{G}, \bar{B})$, $\bar{R}$, $\bar{G}$ and $\bar{B}$ representing the average values of red, green and blue densities, respectively. Since the three Gaussian distributions are not identical, the red, green and blue densities of flesh color exist within an ellipsoid having its center at the coordinate of the average values of the three densities.

The ellipsoid is represented by the following general formula.

$$dS^2 = \sum_{ij=1}^{3} a_{ij} X_i X_j \qquad (1)$$

where $a_{ij}$ is a constant and $$X_1 = B - \bar{B}, \quad X_2 = G - \bar{G}$$

and $$X_3 = R - \bar{R}.$$

The formula can be represented as follows.

$$DS^2 = C_{11}dB^2 + 2C_{12}dB \cdot dG + C_{22}dG^2 + 2C_{23} \cdot dG \cdot dR + C_{33}dR^2 + 2C_{31}dR \cdot dB \qquad (2)$$

Since $dB = X_1$, $dG = X_2$ and $dR = X_3$, $$dB = B - \bar{B}, \quad dG = G - \bar{G}$$

and $$dR = R - \bar{R}.$$

In the formula (2), $C_{ij}$ is an element of an inverse matrix of the following variance-covariance matrix.

$$A = \begin{bmatrix} Var(B) & Cov(B,G) & Cov(R,B) \\ Cov(B,G) & Var(G) & Cov(G,R) \\ Cov(R,B) & Cov(G,R) & Var(R) \end{bmatrix}$$

where $$Var(B) = \frac{1}{N-1} \sum_{i=1}^{N} (B_i - \bar{B})^2$$

$$Var(G) = \frac{1}{N-1} \sum_{i=1}^{N} (G_i - \bar{G})^2$$

$$Var(R) = \frac{1}{N-1} \sum_{i=1}^{N} (R_i - \bar{R})^2$$

$$Cov(B,G) = \frac{1}{N-1} \sum_{i=1}^{N} (B_i - \bar{B})(G_i - \bar{G})$$

$$Cov(G,R) = \frac{1}{N-1} \sum_{i=1}^{N} (G_i - \bar{G})(R_i - \bar{R})$$

$$Cov(R,B) = \frac{1}{N-1} \sum_{i=1}^{N} (R_i - \bar{R})(B_i - \bar{B})$$

wherein N is the number of sample points, and $B_i$, $G_i$ and $R_i$ are densities of the respective colors at the flesh color points.

Figure 1:
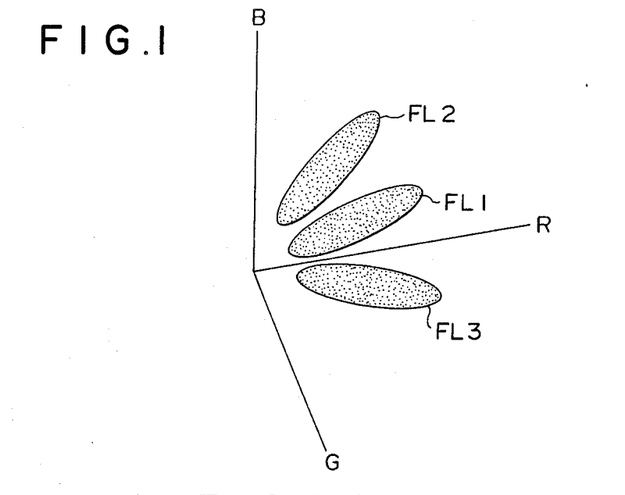
FIG. 1 shows ellipsoids which define flesh color in a three-dimensional coordinate system the axes of which represent the red, green and blue densities.

In formula (1), the size of the ellipsoid changes according to the value of $dS^2$. If the ellipsoid is large, the flesh color area will contain all color points but will cover non-flesh colors too. In this case, flesh color will always detected as such, but on the other hand non-flesh color will also be detected as flesh color. If the ellipsoid is too small, the discrimination will become too fine and there will occur some cases in which flesh color is detected as non-flesh color. When the value $dS^2$ was selected so that 95% of the input data would be contained in the ellipsoid FL.1 as shown in FIG. 1, the value of $dS^2$ became 7.81. In this case, $$\bar{B} = 0.862, \quad \bar{G} = 0.903$$

and $$\bar{R} = 0.923,$$

and $$C_{ij} = \begin{bmatrix} 310.1 & -486.4 & 197.7 \\ -486.4 & 1150.4 & -745.5 \\ 197.7 & -745.5 & 629.5 \end{bmatrix}$$

The above results were obtained with reference to color negatives photographed under daylight condition. When the color negatives were photographed under different illumination conditions such as tungsten light or fluorescent light, the distributions of the three color densities shifted from those of the negatives photographed under daylight condition. For instance, the area of the flesh color shifted from FL1 to FL2 in the case of negatives photographed under tungsten light as shown in FIG. 1. In case of negatives photographed under fluorescent light, the flesh color area FL1 shifted to area FL2.

In all negatives photographed in daylight, tungsten light or fluorescent light, almost all the points of flesh color have red, green and blue densities which fall within one of said three ellipsoids FL1, FL2 and FL3. Further, if a large number of points on a certain negative have their three color densities falling, for example, within the ellipsoid FL1, the negative can be determined to be photographed under daylight condition.

In addition to the method of defining flesh color in a three-dimensional system, it is also possible to define flesh color by use of an ellipse in a two-dimensional coordinate system the two axes of which represent combinations of the three color densities, e.g., one of the axes represents the density difference between green and blue densities (G−B) and the other represents the density difference between red and green densities (R−G).

In order to simplify the calculation process, flesh color may be defined by use of a triangle or a trapezoid.

Figure 2:
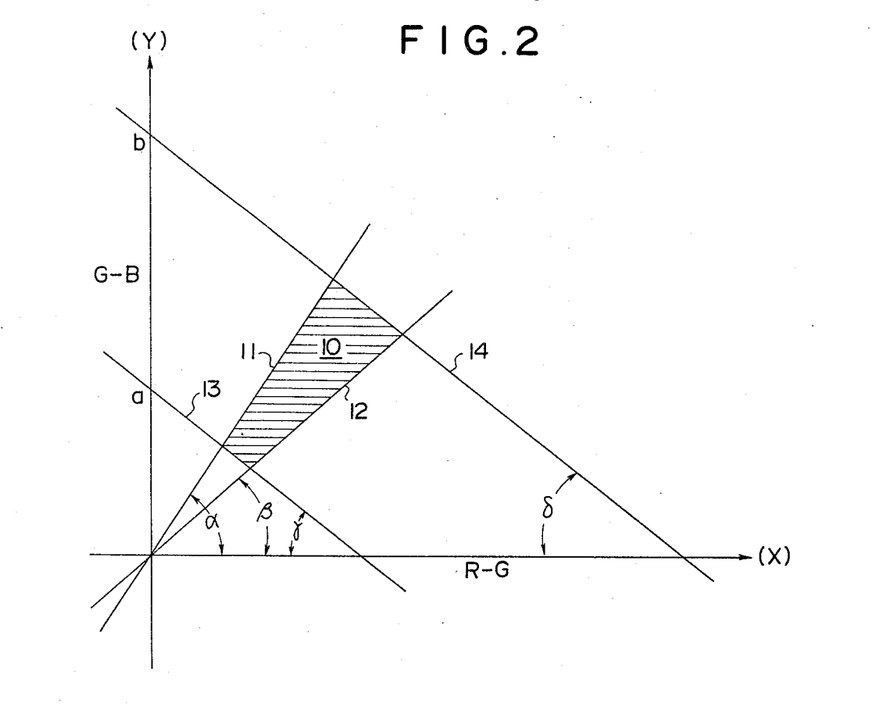
FIG. 2 shows a trapezoid in which defines flesh color a two-dimensional coordinate system the axes of which respectively represent the density differences between green and blue densities, and between red and green densities.

FIG. 2 shows an example in which flesh color is defined by use of a trapezoid 10 in a two-dimensional coordinate system the Y and X axes of which represent the density difference between green and blue densities (G−B) and the density difference between red and green densities (R−G), respectively. Four lines 11 to 14 including each edge of the trapezoid 10 are represented by the following formulae.

line 11 ... $Y = \tan \alpha \cdot X$ line 12 ... $Y = \tan \beta \cdot X$ line 13 ... $Y = -\tan \gamma \cdot X + a$ line 14 ... $Y = -\tan \delta \cdot X + b$ Accordingly, when the red, green and blue densities of a point, or the differences between the green and blue densities (Y) and between the red and green densities (X) satisfy the following inequalities, the point is determined to have flesh color.

$Y \leq \tan \alpha \cdot X$ $Y \geq \tan \beta \cdot X$ $Y \geq (-\tan \gamma) \cdot X + a$ $Y \leq (-\tan \delta) \cdot X + b$ In case that flesh color is defined by an ellipsoid represented by the formula (1), a point is determined to have flesh color when its red, green and blue densities are of such values that make $dS^2$ not larger than a predetermined constant K, e.g., 7.81.

Colors other than flesh color can also be defined by use of regions in a chromaticity coordinate system in a similar manner. Whether or not the measured densities of a point fall within the defined area is determined through calculation as will be described hereinbelow.

Figure 3:
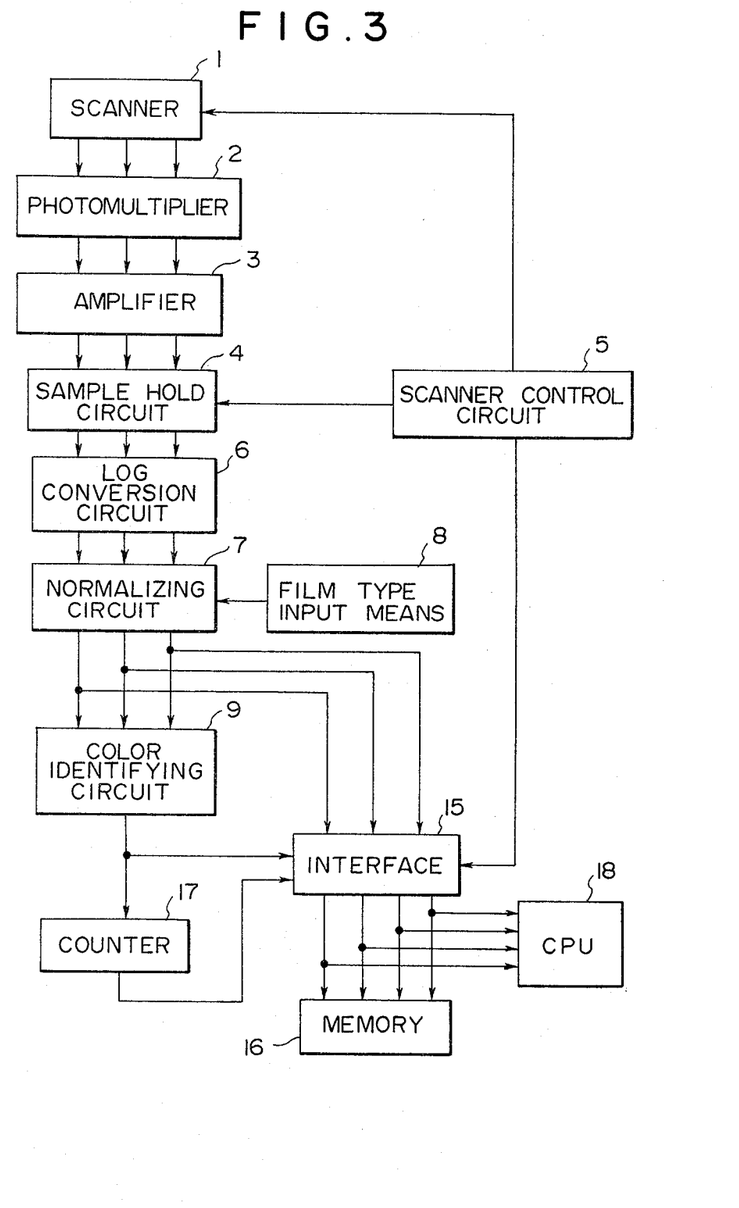
FIG. 3 is a block diagram illustrating an example of an exposure control system for a color printer using a color detecting device for detecting a particular color in accordance with an embodiment of this invention.

FIG. 3 is a block diagram for illustrating an example of an exposure control system for a color printer using a color detecting device for detecting a particular color in accordance with an embodiment of this invention.

A color negative is scanned by a scanner 1 and the light passing through the color negative (or the light reflected by the surface of the negative) is separated into three colors, i.e., red, green and blue by means of a three color separating optical element. The light of each color is measured of its density in a separate photomultiplier 2.

The outputs of the photomultiplier 2 corresponding to the respective separated colors of light are amplified by an amplifier 3 and sampled by sample hold circuit 4. The sampling action of the sample hold circuit 4 is controlled by sampling pulses fed from a scanner control circuit 5 which also controls the scanning means of the scanner 1 so that the sample is held in synchronization with the scanner 1. Therefore, the color negative is measured at a plurality of points equally spaced and arranged in order. For example in case of a negative having an image frame size of 24 mm×36 mm, 748 points (22×34) each having a diameter of 1 mm are sampled at intervals of 1 mm.

The sampled signals held by the sample hold circuit 4 are fed to a log conversion circuit 6 to be log-converted and the red, green and blue densities $\overline{R}$, $\overline{G}$, $\overline{B}$ of each measured point is calculated thereby. More specifically, log 1/T (T: transmissivity) is calculated.

The calculated densities R, G and B are delivered to a normalizing circuit 7 to be linear-converted depending on signals fed from a film type input means 8 which outputs different signals depending on the gamma value and sensitivity of the negative. As mentioned above, color films of different gamma values and sensitivities give different color densities even for the same subject matter photographed under the same condition. Therefore, the calculated densities are normalized by the normalizing circuit 7 so that the same values are given for the same exposure regardless of the kind of film.

The normalized values of red, green and blue densities of each measured point are inputted to a color identifying circuit 9 in which it is determined whether or not the measured point has the predetermined particular color by using the normalized values in the calculation described above.

When the color identifying circuit 9 has determined that the measured point has the particular color, the circuit 9 outputs a binary one signal. Otherwise it outputs a binary zero signal. The signal outputted from the circuit 9 together with the normalized values of red, green and blue densities of each measured point is given to an interface 15 and stored in a memory 16 at an address specified by a measuring position signal delivered from the scanner control circuit 5 to the interface 15.

The number of binary "1" output signals is counted by a counter 17 and when the number of the binary "1" signals exceeds a predetermined number, the counter 17 outputs a signal which is delivered to CPU (Central Processor Unit) 18 through the interface 15.

When the sum of the binary "1" output signals of the identifying circuit is more than the predetermined number, the counter 17 gives a command to the memory 16 to read the stored data. At this time, only the data corresponding to the points determined to have the particular color are sent to the CPU 18. The CPU 18 calculates the respective average densities of the three colors ($\overline{R}$, $\overline{G}$, $\overline{B}$) of the particular color points. The average densities $\overline{R}$, $\overline{G}$ and $\overline{B}$ are sent to the exposure control system of the color printer for controlling the exposure. Thus, the subject matter having the predetermined particular color is reproduced in a good condition.

When the sum of the measured points having the particular color is not more than a predetermined number, the color negative is printed according to the conventional LATD printing system or some other system.

When the color detecting device of the present invention is off-lined with the color printer, the data are recorded on a magnetic recording tape or perforated slip and the color printer is controlled thereby.

In the device of this invention, more than one predominant color can be detected. If it is determined that two or more of such predominant colors are included in the negative, the negative should be printed based on the color densities of one of them. What is to be considered a predominant color may be determined according to the number of the measured points the color of which is determined to have the predominant color, or may be selected according to a priority system.

Figure 4:
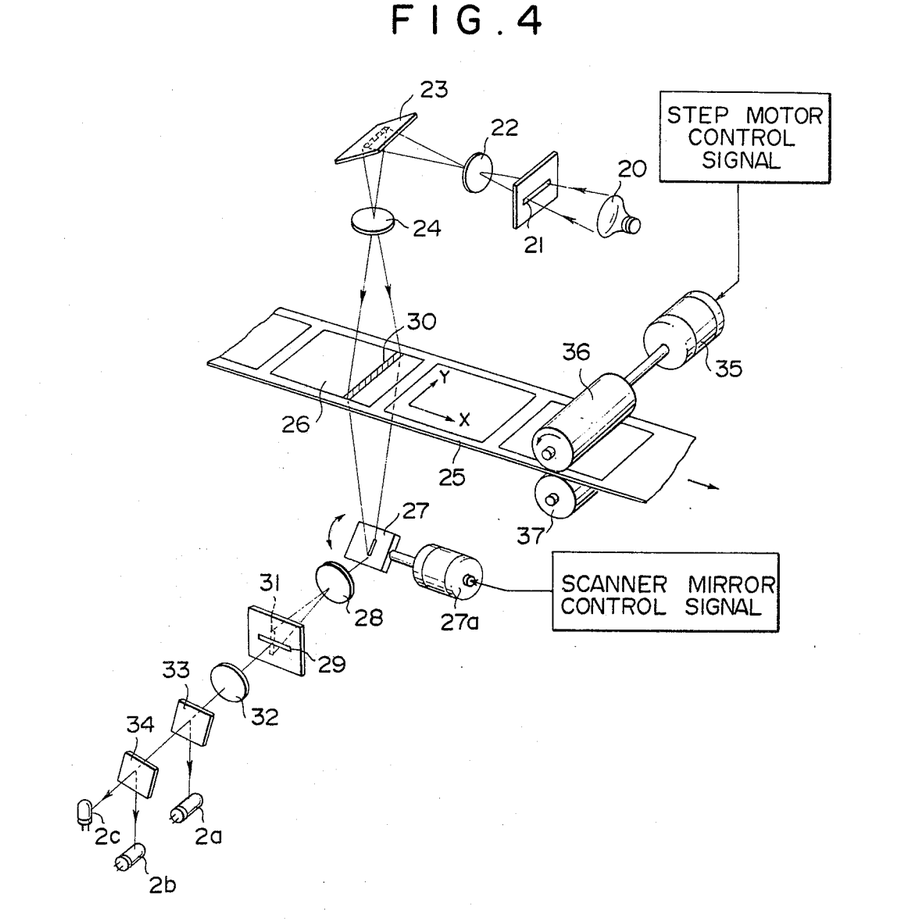
FIG. 4 is a perspective view of a scanner which can be used in the device shown in FIG. 3.

FIG. 4 shows an example of a scanner which can be used in the particular color detecting device of this invention.

In the scanner shown in FIG. 4, the illuminating light from a light source 20 is limited in width by a narrow slit 21. The thin light beam passing through the slit 21 goes through a lens 22 to impinge upon a reflective mirror 23. The light beam is then reflected downwardly by the mirror 23 to pass through another lens 24 and reaches the surface 26 of a color negative 25. The thin light beam illuminates a strip-like zone 30 of the surface 26 about 1 mm wide and extending in the transverse direction of the negative 25.

The strip-like light passing through the negative 25 is reflected by a scanner mirror 27 located below the color negative 25 to reach a slit 29 through a lens 28. The scanner mirror 27 is secured to the rotating axis of a galvanometer 27a to rotate together therewith. The galvanometer 27a is controlled by a mirror controlling signal of saw-tooth wave form given by the scanner control circuit 5 shown in FIG. 3 and rotates the mirror 27.

The image of the strip-like zone 30 of the negative 25 is projected on the slit 29 in an image 31 extending in the direction transverse to the slit 29. The projected image 31 of the zone 30 shifts in the direction transverse to the slit 29 as the scanner mirror 27 rotates. Accordingly only a part of the image 31 can pass through the slit 29, and the part of the image 31 which passes through the slit 29 is varied from one end thereof to the other as the mirror 27 rotates.

The light passing through the slit 29 travels through a lens 32 and is separated into three colors, namely red, green and blue, by means of a pair of dichroic mirrors 33 and 34. The quantity of the light beam of each of the three colors is measured by means of one of the photomultipliers 2a, 2b and 2c.

The surface 26 of the color negative 25 is scanned in the transverse direction by means of the scanner mirror 27, while the negative 25 is scanned in the longitudinal direction by intermittently transferring the negative 25 in the longitudinal direction. The negative 25 is transferred by a pair of film feeding rollers 36 and 37. The roller 36 is driven by a step motor 35 which is controlled by the scanner control circuit 5. The step motor 35 is rotated through a predetermined angle controlled by a signal which is generated by the scanner control circuit 5 when said scanner mirror 27 returns to its starting position. When the step motor 35 rotates, the roller 36 is rotated to move the negative 25 in the longitudinal direction by a predetermined length.

Figure 5:
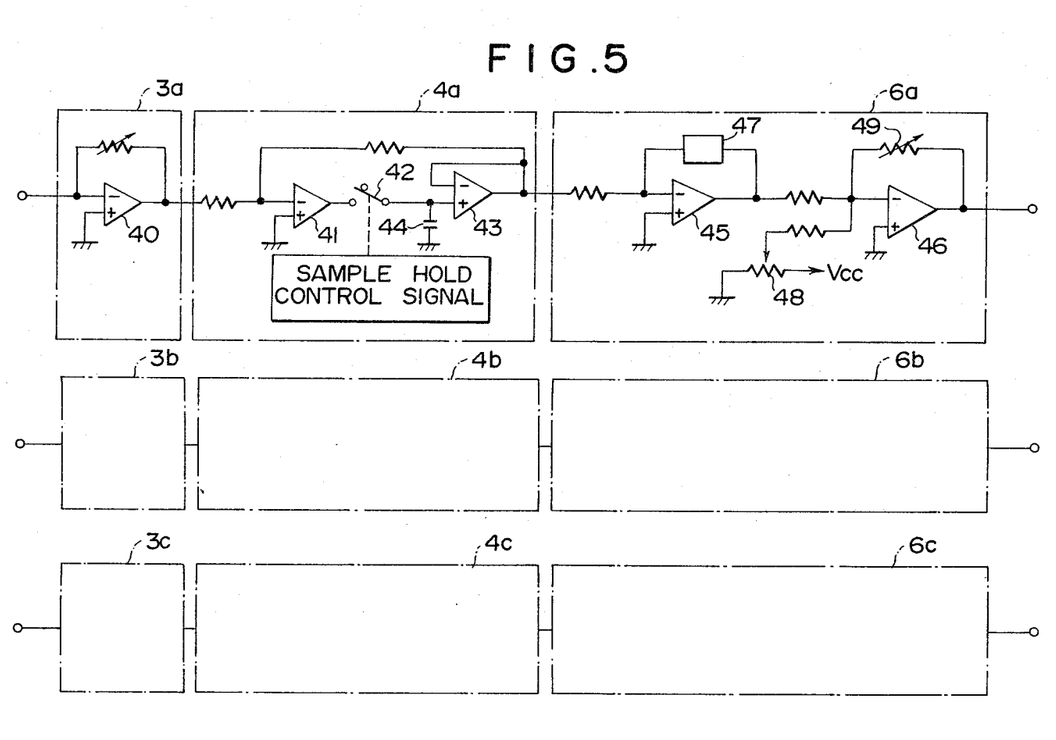
FIG. 5 is a circuit diagram of an amplifier, a sample hold circuit and a log conversion circuit which can be used in the device shown in FIG. 3.

FIG. 5 shows an example of the amplifier 3, the sample hold circuit 4 and the log conversion circuit 6.

The amplifier 3 includes three amplifiers 3a, 3b and 3c for the separated blue, green and red lights, respectively. Similarly, the sample hold circuit 4 and the log conversion circuit 6 include three sample hold circuits 4a, 4b and 4c, and three log conversion circuits 6a, 6b, 6c, respectively. Each amplifier comprises an operational amplifier 40, for example.

The outputs of the photomultipliers 2a, 2b and 2c respectively corresponding to the light quantities of blue, green and red are amplified by the respective amplifiers 3a, 3b and 3c and fed to the respective sample hold circuits 4a, 4b and 4c to be sampled.

In each sample hold circuit 4, the output terminal of a first operational amplifier 41 is connected to the non-inversion input terminal of a second operational amplifier 43 through a switch 42. To the non-inversion input terminal of the second operational amplifier 43 is connected a capacitor 44. The switch 42 is opened when the sampling control signal is generated by said sample hold control circuit 5. When the switch 42 is opened, the output signal of the first operational amplifier 41 outputted immediately before the opening of the switch 42 is stored in the capacitor 44.

The second operational amplifier 43 outputs electric current corresponding to the voltage of the capacitor 44, since the inversion input terminal and the output terminal thereof are short-circuited.

In this manner, the measured signals of the three colors for each measured point are sampled by the sample hold circuits 4a, 4b and 4c, respectively.

Each sampled signal is applied to the log conversion circuit 6 to be log-converted, where the transmission densities are calculated through the transmissivities T.

Each log conversion circuit 6a, 6b, 6c comprises an operational amplifier 45 for log conversion and operational amplifier 46 for level adjustment. To the feedback circuit of the log conversion operational amplifier 45 is connected a log expansion element 47, for example a log diode. An example of the input-output characteristics of such a log conversion operational amplifier are shown in Table 1.

TABLE 1

| Transmissivity (T) % | Transmission Density (D) | Input (V) | Output (V) |
|---|---|---|---|
| 100 | 0 | 10 | 4 |
| 10 | 1 | 1 | 2 |
| 1 | 2 | 0.1 | 0 |
| 0.1 | 3 | 0.01 | -2 |

Since an analog computer has an output range of about ±10 V, the level is adjusted by said level adjusting operational amplifier 46 disposed in the next stage in order to effectively utilize the output range. Thus, a constant-level potential is added to the log-converted density signals by a potentiometer 48, and subsequently the adjusted log-converted density signals are amplified with a gain determined by the resistance of a feed-back resistor 49.

Figure 6:
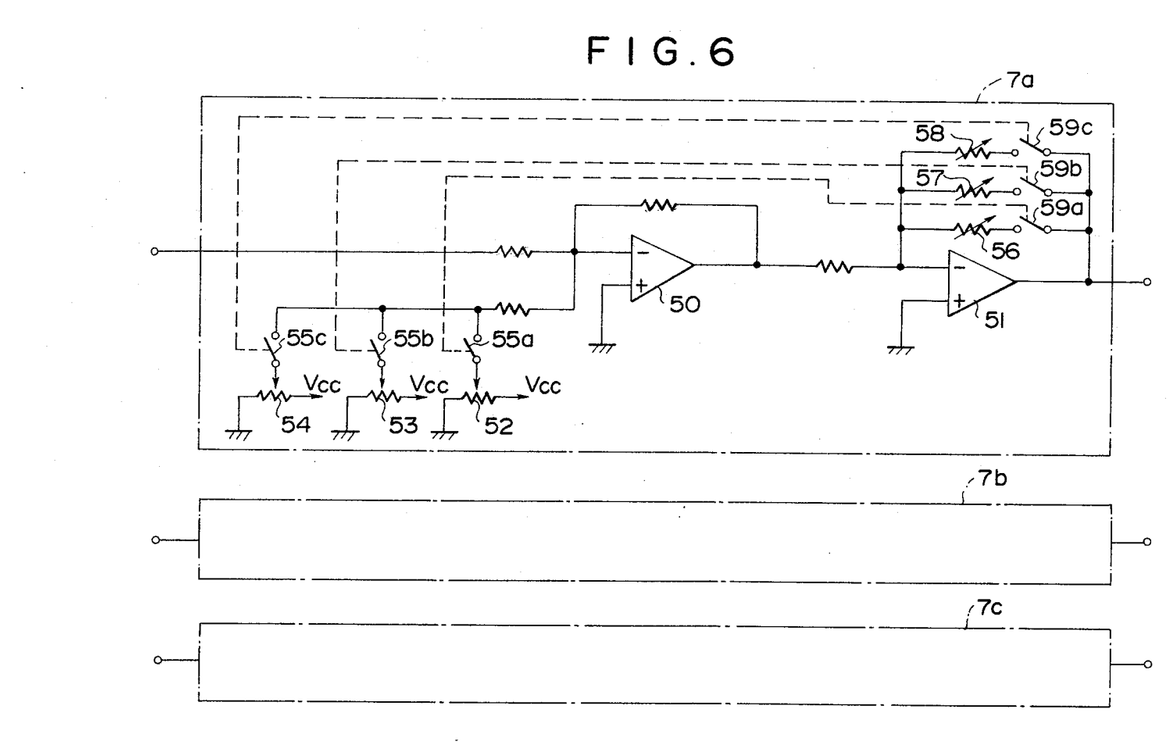
FIG. 6 is a circuit diagram of a normalizing circuit which can be used in the device shown in FIG. 3.

FIG. 6 shows an example of the normalizing circuit 7. The normalizing circuit 7 also includes three normalizing circuits 7a, 7b and 7c for the blue, green and red density signals, respectively. Each normalizing circuit comprises a pair of operational amplifiers 50 and 51 connected in series with each other. To the inversion input terminal of the first operational amplifier 50 are connected three potentiometers 52, 53 and 54 through selective switches 55a, 55b and 55c, respectively.

The potentiometers 52, 53 and 54 add constants of different predetermined values to the density signals from the log conversion circuit 6 to correct the density signals in accordance with the sensitivity of said color negative. Said three selective switches 55a, 55b and 55c are closed selectively to connect one of the potentiometers 52, 53 and 54 in accordance with the type of the negative being to be printed. Thus, in the normalizing circuit of this example, three types of negatives can be normalized. However, it is preferred that four or more selective switches and potentiometers be provided so that more types of negatives can be normalized.

The density signals corrected in accordance with the sensitivity of the negative by the first operational amplifier 50 are amplified by the second operational amplifier 51 to be corrected in accordance with the gamma value of the negative. To the feed-back circuit of the second operational amplifier 51 are connected in parallel three variable resistors 56, 57 and 58 for gain adjustment. Three selective switches 59a, 59b and 59c are connected in series respectively with the variable resistors 56, 57 and 58. Accordingly, the gain can be adjusted by at least three steps. The selective switches 59a, 59b and 59c are respectively turned on and off in response to the operation of the selective switches 55a, 55b and 55c for said potentiometers 53, 54 and 55.

Figure 7:
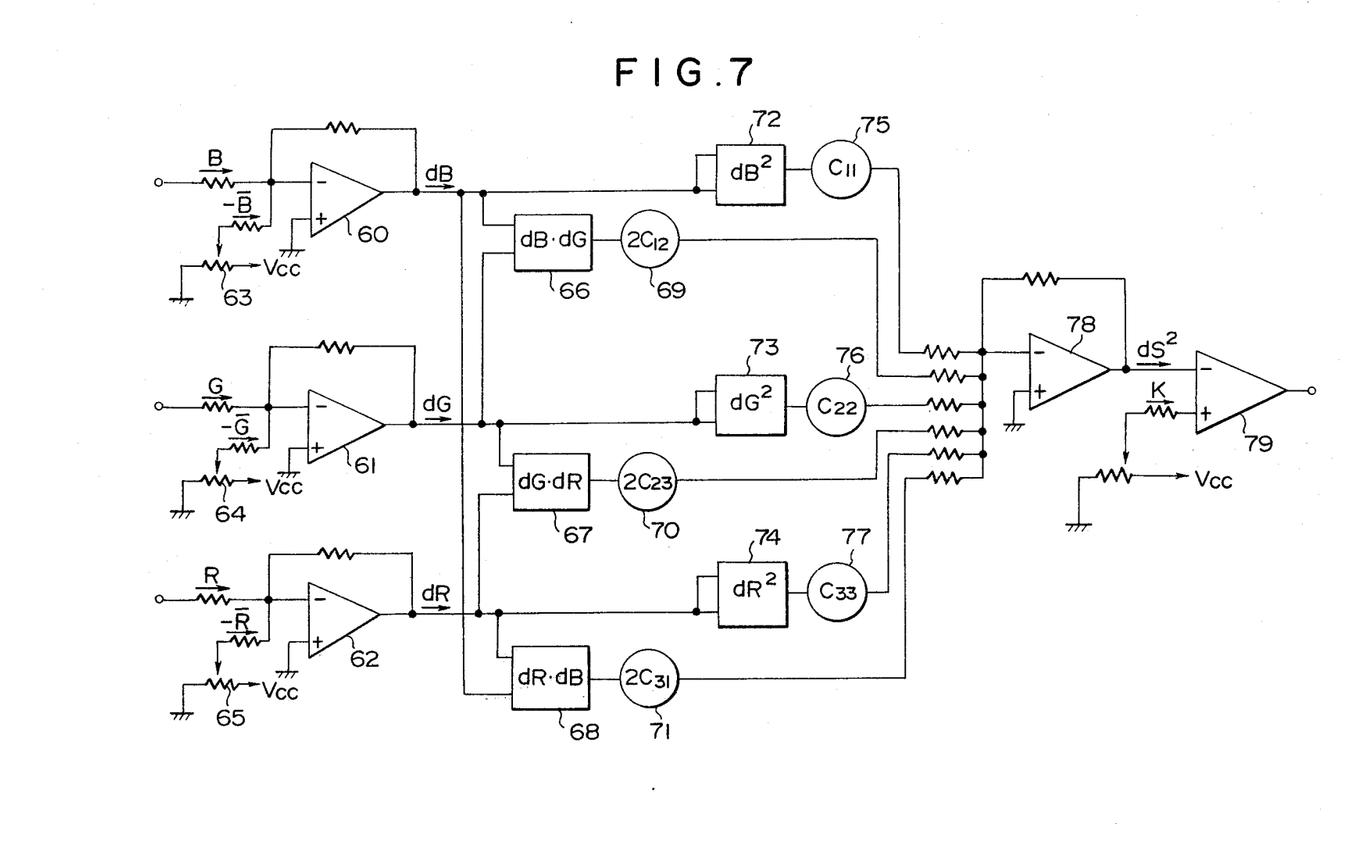
FIG. 7 is a circuit diagram of an example of the color identifying circuit which can be used when the particular color is defined by an ellipsoid.

FIG. 7 shows an example of the identifying circuit which is used when the particular color is defined by an ellipsoid.

When the particular color is defined by an ellipsoid in a three-dimensional coordinate system, the measured spot is determined to have the particular color if $dS^2$ is not more than the above described predetermined constant K, wherein $$dS^2 = C_{11}dB^2 + 2C_{12}dB \cdot dG + C_{22}dG^2 + 2C_{23} \cdot dG \cdot dR + C_{33}dR^2 + 2C_{31}dR \cdot dB \tag{2}$$

In the above formula (2) dB, dG and dR are as follows.

$$dB = B - \overline{B}$$

$$dG = G - \overline{G}$$

$$dR = R - \overline{R}$$

The normalized blue, green and red densities B, G and R are respectively inputted to three operational amplifiers 60, 61 and 62 which constitute subtractors. Differences between B and $\overline{B}$ (B−$\overline{B}$), G and $\overline{G}$ (G−$\overline{G}$) and R and $\overline{R}$ (R−$\overline{R}$) are respectively calculated by the operational amplifiers 60, 61 and 62 to give values of dB, dG and dR where $\overline{B}$, $\overline{G}$ and $\overline{R}$ are average blue, green and red densities, respectively, and are inputted to the respective amplifiers by means of potentiometers 63, 64 and 65.

Two of dB, dG and dR are inputted to each of the multipliers 66, 67 and 68, and dB·dR, dG·dR and dR·dB are respectively calculated thereby. The calculated dB·dR, dG·dR and dR·dB are subsequently inputted to coefficient multipliers 69, 70 and 71 and respectively multiplied by the coefficients $2C_{12}$, $2C_{23}$ and $2C_{31}$ thereby.

Further, said dB, dG and dR are respectively inputted to multipliers 72, 73 and 74 to be squared and subsequently multiplied by the $C_{11}$, $C_{22}$ and $C_{33}$ by means of coefficient multipliers 75, 76 and 77 to give $C_{11}dB^2$, $C_{22}dG^2$ and $C_{33}dR^2$, respectively. The thus calculated $C_{11}dB^2$, $C_{22}dG^2$, $C_{33}dR^2$, $2C_{12}dB \cdot dG$, $2C_{23}dG \cdot dR$ and $2C_{31}dR \cdot dB$ are inputted to an operational amplifier 78 to be summed thereby. Thus, $dS^2$ for the measured point is calculated using the normalized blue, green and red densities.

Thus calculated $dS^2$ for the specific measured point is compared with the predetermined constant K as described above. This comparison is carried out by means of a comparator 79. The comparator 79 emits a binary output signal of "1" when $dS^2 \leq K$ and emits a binary output signal of "0" when $dS^2 > K$.

Six multipliers are required in the identifying circuit shown in FIG. 7. Multipliers are not only complicated in structure and expensive, but also require a relatively long computing time. Accordingly, it is preferred to orthogonalize the formula (2) to decrease the number of the multiplier terms to three.

The ellipsoid defining the particular color is represented by the following formula, when orthogonalized.

$$dS^2 = (a_{11}dB + a_{12}dG + a_{13}dR)^2 + (a_{21}dB + a_{22}dG + a_{23}dR)^2 + (a_{31}dB + a_{32}dG + a_{33}dR)^2 \tag{3}$$

Figure 8:
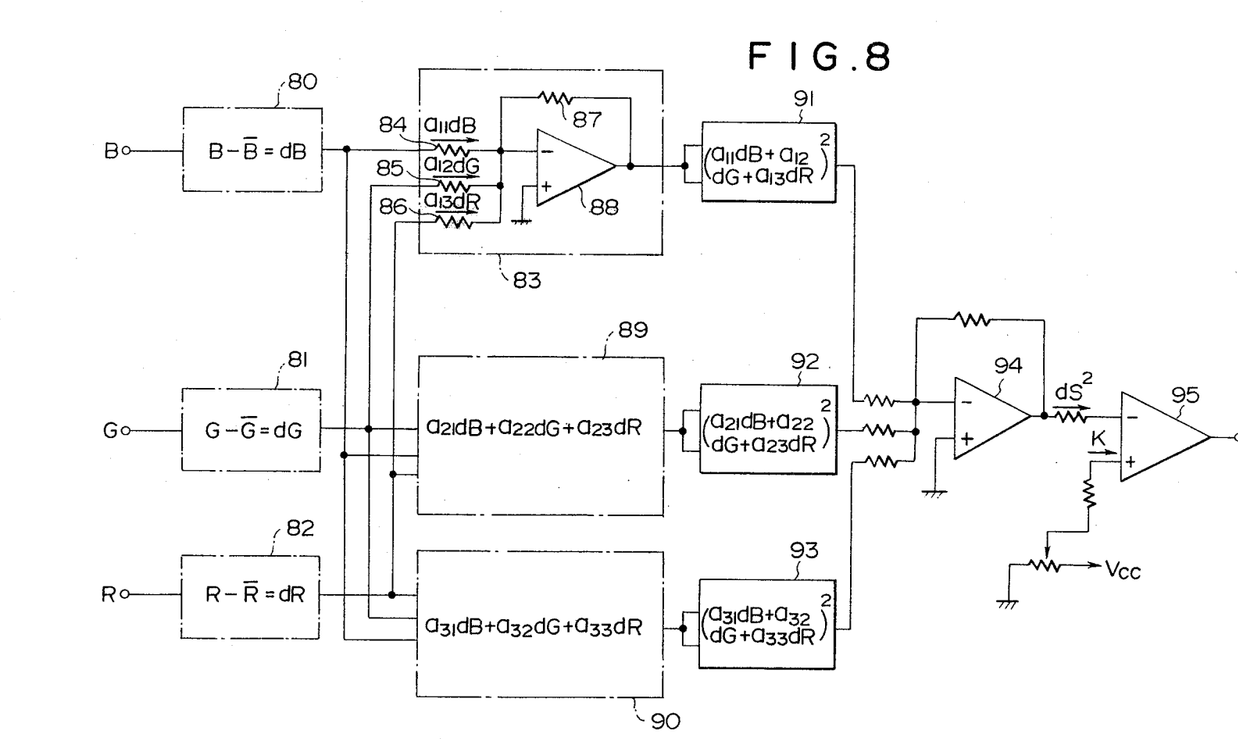
FIG. 8 is a circuit diagram of another example of the color identifying circuit which can be used when the particular color is defined by orthogonalized ellipsoid.

FIG. 8 shows an example of an identifying circuit which can be used for the orthogonalized ellipsoid.

In FIG. 8, $dB = B - \overline{B}$, $dG = G - \overline{G}$ and $dR = R - \overline{R}$ are respectively calculated by subtractors 80, 81 and 82. The calculated dB, dG and dR are inputted to an adder 83. In the adder 83 dB, dG and dR are respectively multiplied by coefficients $a_{11}$, $a_{12}$ and $a_{13}$ which are determined depending on ratios between the feed-back resistance 87 of an operational amplifier 88 and each of input resistances 84, 85 and 86, and subsequently added together by the operational amplifier 88. Thus, $(a_{11}dB + a_{12}dG + a_{13}dR)$ of the formula (3) is calculated. Similarly, $(a_{21}dB + a_{22}dG + a_{23}dR)$ and $(a_{31}dB + a_{32}dG + a_{33}dR)$ are calculated by adders 89 and 90, respectively.

The three calculated values are respectively squared by multipliers 91, 92 and 93, and are summed by an operational amplifier 94 which constitutes an adder. Thus, $dS^2$ of the formula (3) is calculated. The calculated $dS^2$ is compared with the predetermined constant K by a comparator 95.

Figure 9:
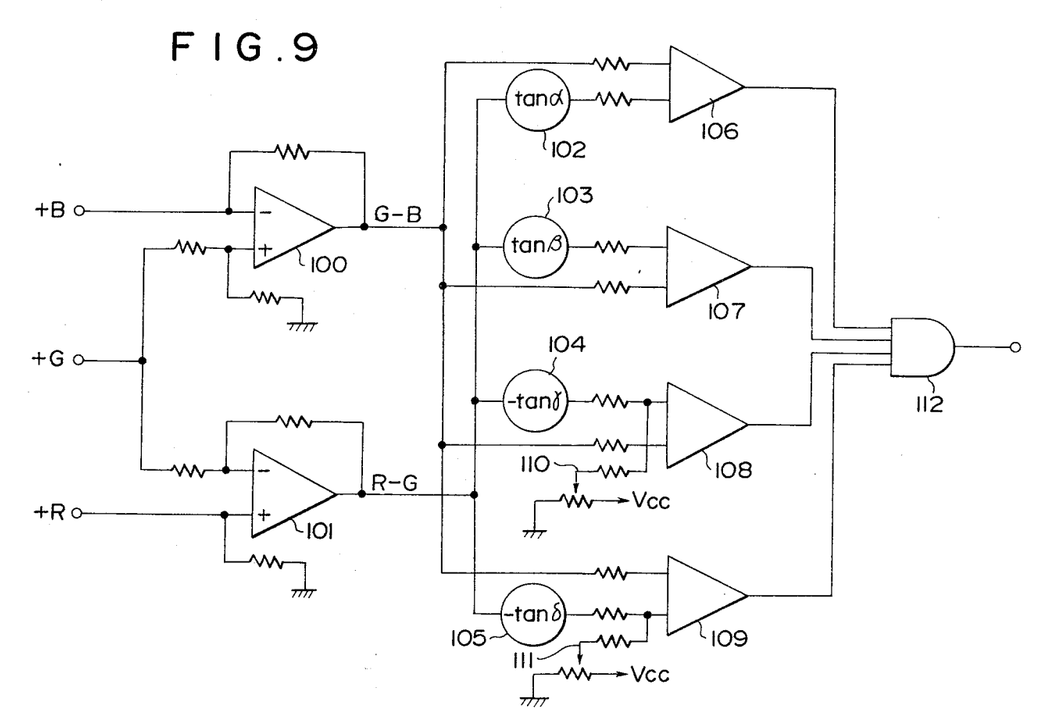
FIG. 9 is a circuit diagram of still another example of the color identifying circuit which can be used when the particular color is defined by a trapezoid.

FIG. 9 shows an example of a color identifying circuit which is used when the particular color is defined by a polygon in a two-dimensional coordinate system as described above and shown in FIG. 2.

In FIG. 9, the normalized green and blue densities G and B are inputted to an operational amplifier 100 which constitutes a subtractor and the difference between them, i.e., G−B, is calculated. Similarly, the difference between the normalized red and green densities i.e., $R-G$, is calculated by an operational amplifier 101.

As described above, in order for the measured densities to fall within the trapezoid 10 shown in FIG. 2, Y and X which respectively represent $(G-B)$ and $(R-G)$ should satisfy the following conditions.

$$Y \leq \tan \alpha \cdot X \quad (4)$$

$$Y \geq \tan \beta \cdot X \quad (5)$$

$$Y \geq (-\tan \gamma) \cdot X + a \quad (6)$$

$$Y \leq (-\tan \delta) \cdot X + b \quad (7)$$

The calculated $(R-G)$ is multiplied by $\tan \alpha$, $\tan \beta$, $(-\tan \gamma)$ and $(-\tan \delta)$ by means of respective coefficient multipliers 102, 103, 104 and 105 to give $\tan \alpha \cdot X$, $\tan \beta \cdot X$, $(-\tan \gamma) \cdot X$ and $(-\tan \beta) \cdot X$. The values of $\tan \alpha \cdot X$ and $\tan \beta \cdot X$ are respectively compared with $(G-B)$ by means of comparators 106 and 107. The values of $(-\tan \gamma) \cdot X$ and $(-\tan \delta) \cdot X$ are respectively added with "a" and "b" by potentiometers 110 and 111 to give $(-\tan \gamma) \cdot X + a$ and $(-\tan \delta) \cdot X + b$. Then, $(-\tan \gamma) \cdot X + a$ and $(-\tan \delta) \cdot X + b$ are respectively compared with $(G-B)$ by means of comparators 108 and 109.

The comparators 106-109 respectively output binary signals of "1" when said inequalities (4)-(7) are satisfied. Otherwise, the comparators 106-109 respectively output binary signals of "0". The output of each of the comparators 106-109 is inputted to an AND circuit 112. The AND circuit 112 emits a binary output signal of "1" only when output signals of the comparators 106-109 are all "1", which represents the case where the four inequalities (4)-(7) are all satisfied.

We claim:

1. A color detecting device for determining whether or not a particular color is included in a color negative comprising a color density measuring means which measures the red, green and blue densities of a plurality of points on a color negative, a normalizing means which normalizes the measured densities to correct their values in accordance with the gamma value and sensitivity of the negative, and a color identifying means which determines whether or not the normalized color densities fall within a predetermined range in a chromaticity coordinate system when plotted therein, said particular color being defined by said region and said chromaticity coordinate system being a two or three dimensional coordinate system the axes of which represent the red, green and blue densities or combinations thereof.

2. A color detecting device as defined in claim 1 wherein said normalizing means comprises a sensitivity correcting means which adds a predetermined constant value determined in accordance with the sensitivity of the negative to the values of the measured color densities, and a gamma correcting means which amplifies the values of the sensitivity-corrected measured color densities in accordance with the gamma value of the negative.

3. A color detecting device as defined in claim 2 wherein said sensitivity correcting means includes a plurality of selective switches for selecting the value of said constant value, and said gamma correcting means includes a plurality of selective switches for selecting its gain, the selective switches of both of said correcting means being turned on and off in response to each other so that when one of the selective switches of the sensitivity correcting means is turned on, one of the selective switches of the gamma correcting means corresponding to the selective switch of the sensitivity correcting means with respect to the type of the negative is turned on.

4. A color detecting device as defined in claim 2 wherein both of said correcting means comprise operational amplifiers.

5. A color detecting device as defined in claim 1 wherein said measuring means comprises a scanner which optically scans the color negative, a color separating optical element which separates the light from the scanner and passing through or reflected by the color negative into red, green and blue colors of light, and three photodetectors for measuring the light of red, green and blue color from the color separating optical element.

* * * * *